(12) United States Patent
Snider et al.

(10) Patent No.: US 11,391,486 B2
(45) Date of Patent: Jul. 19, 2022

(54) CONTROL UNIT FOR MULTIPLE VARIABLE FREQUENCY DRIVES

(71) Applicant: Johnson Controls Technology Company, Auburn Hills, MI (US)

(72) Inventors: Ryan L. Snider, York, PA (US); Nicholas P. Mislak, Bel Air, MD (US); Olivier Donfack, York, PA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 125 days.

(21) Appl. No.: 16/293,849

(22) Filed: Mar. 6, 2019

(65) Prior Publication Data
US 2020/0248923 A1    Aug. 6, 2020

Related U.S. Application Data

(60) Provisional application No. 62/801,521, filed on Feb. 5, 2019.

(51) Int. Cl.
| | |
|---|---|
| *F24F 11/74* | (2018.01) |
| *F24F 11/77* | (2018.01) |
| *H02P 5/74* | (2006.01) |
| *F24F 11/52* | (2018.01) |
| *F04D 25/06* | (2006.01) |
| *F04D 27/00* | (2006.01) |
| *G05B 15/02* | (2006.01) |

(52) U.S. Cl.
CPC ............ *F24F 11/77* (2018.01); *F04D 25/06* (2013.01); *F04D 27/004* (2013.01); *F24F 11/52* (2018.01); *G05B 15/02* (2013.01); *H02P 5/74* (2013.01)

(58) Field of Classification Search
CPC ........................................................ F24F 11/74
USPC ........................................................ 700/276
See application file for complete search history.

(56) References Cited

U.S. PATENT DOCUMENTS

| | | | |
|---|---|---|---|
| 6,147,469 A * | 11/2000 | Uchida .............. | G05B 19/4142 318/675 |
| 8,918,218 B2 | 12/2014 | Grabinger et al. | |
| 9,741,082 B2 | 8/2017 | Holub et al. | |
| 9,964,330 B2 | 5/2018 | Son et al. | |
| 10,034,067 B1 * | 7/2018 | Palmgren, III ....... | E21B 43/128 |

(Continued)

FOREIGN PATENT DOCUMENTS

WO    2018011761 A1    1/2018

*Primary Examiner* — Suresh Suryawanshi
(74) *Attorney, Agent, or Firm* — Fletcher Yoder, P.C.

(57) ABSTRACT

A control unit is communicatively coupled to multiple variable frequency drives. The control unit includes a controller, and each variable frequency drive may have a respective controller. The controller of the control unit may be communicatively coupled to each variable frequency drive controller and manage and/or configure the multiple variable frequency drives by sending instructions and/or receiving information from the variable frequency drive controllers. In some embodiments, the control unit may be implemented as a part of a mobile computing device, such that the controller may wirelessly and communicatively couple to each variable frequency drive controller. In this manner, managing or changing settings and/or control parameters of multiple variable frequency drives may be performed via a single control unit, avoiding the tedious, repetitive, and inefficient process of using multiple control units.

21 Claims, 6 Drawing Sheets

(56) References Cited

U.S. PATENT DOCUMENTS

| | | | |
|---|---|---|---|
| 10,138,901 B2* | 11/2018 | Benson | F04D 25/166 |
| 2009/0236432 A1* | 9/2009 | Malloy | F24F 3/044 |
| | | | 236/49.3 |
| 2011/0018472 A1* | 1/2011 | Rockenfeller | H02P 5/74 |
| | | | 318/51 |
| 2011/0046790 A1* | 2/2011 | Miller | F24F 11/46 |
| | | | 700/276 |
| 2012/0191252 A1* | 7/2012 | Rockenfeller | F25B 27/005 |
| | | | 700/276 |
| 2012/0239208 A1* | 9/2012 | Federspiel | F24F 11/30 |
| | | | 700/277 |
| 2014/0097779 A1* | 4/2014 | Hopkins | H02P 5/54 |
| | | | 318/460 |
| 2014/0244051 A1* | 8/2014 | Rollins | F04D 25/0606 |
| | | | 700/282 |
| 2014/0371920 A1* | 12/2014 | Varadi | F24F 11/30 |
| | | | 700/276 |
| 2015/0179054 A1 | 6/2015 | Castillo et al. | |
| 2018/0102726 A1* | 4/2018 | Dubensky | F24F 11/30 |
| 2019/0236446 A1* | 8/2019 | Qin | G05B 17/02 |
| 2019/0293312 A1* | 9/2019 | Hill, Jr. | F24F 11/61 |
| 2019/0348942 A1* | 11/2019 | Onodera | H02P 29/00 |

\* cited by examiner

CONTROL UNIT FOR MULTIPLE VARIABLE FREQUENCY DRIVES

CROSS REFERENCE TO RELATED APPLICATIONS

This application claims priority from and the benefit of U.S. Provisional Application Ser. No. 62/801,521, entitled "CONTROL UNIT FOR MULTIPLE VARIABLE FREQUENCY DRIVES," filed Feb. 5, 2019, which is hereby incorporated by reference in its entirety for all purposes.

BACKGROUND

The present disclosure generally relates to a heating, ventilation, and/or air conditioning (HVAC) system and, more particularly, to a control unit used to control variable frequency drives of the HVAC system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An HVAC system typically controls air conditions, such as temperature and/or humidity, within a building, by controlling speeds of fans or fan systems of the HVAC system. Each fan or fan system of the HVAC system may be driven by a respective motor, whose speed may in turn be controlled by operating a respective variable frequency drive. Each variable frequency drive may be managed and/or configured by a respective control unit via, for example, a keypad or graphical display. HVAC systems that have multiple variable frequency drives, such as four, six, or more variable frequency drives, may thus be managed and/or configured by multiple control units, making the process of managing or changing settings or control parameters of the multiple variable frequency drives tedious, repetitive, and inefficient.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heating, ventilation, and air conditioning (HVAC) system having fans that direct airflow through the HVAC system to a structure The HVAC system also includes motors, where each motor is coupled to and drives a respective fan. The HVAC system further includes variable frequency drives, where each variable frequency drive is coupled to a respective motor and includes a respective variable frequency drive controller that controls a respective speed at which the respective motor drives the respective fan by adjusting frequency of electrical power supplied to the respective motor. The HVAC system also includes a multi-variable frequency drive control unit having a multi-variable frequency drive controller communicatively coupled to each variable frequency drive controller of each variable frequency drive. The multi-variable frequency drive controller adjusts a control parameter of each variable frequency drive.

In another embodiment, a multi-variable frequency drive control unit of an HVAC system having a communication device that enables a processor to communicate with variable frequency drives that drive respective fan motors. The multi-variable frequency drive control unit includes a multi-variable frequency drive controller having a memory device and the processor. The processor, when executing instructions stored in the memory device, receives, via the communication device, addresses of the variable frequency drives. The processor also communicatively couples to the variable frequency drives using the addresses via the communication device. The processor further adjusts an operational setting of the variable frequency drives via the communication device to control environmental conditions within a structure.

In yet another embodiment, an HVAC system controls environmental conditions of a structure that includes fan systems that direct airflow through the HVAC system to the structure. Each fan system includes fan blades, a motor that drive the fan blades, and a variable frequency drive including a variable frequency drive controller that controls a speed at which the motor drives the fan blades by adjusting power supply to the motor. The HVAC system also includes a multi-variable frequency drive control unit having a multi-variable frequency drive controller communicatively coupled to each variable frequency drive controller. The multi-variable frequency drive controller adjusts a control parameter of each variable frequency drive to control environmental conditions of the structure.

BRIEF DESCRIPTION OF THE DRAWINGS

Various aspects of the present disclosure may be better understood upon reading the following detailed description and upon reference to the drawings, in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or some embodiments" of the present disclosure are not intended to be interpreted as excluding the existence of additional embodiments that also incorporate the recited features.

Generally, a heating, ventilation, and air/or conditioning (HVAC) system may control air conditions, such as temperature and/or humidity, within a structure, by directing airflow through the HVAC system to the structure via controlling speeds of fans or fan systems of the HVAC system. Each fan or fan system of the HVAC system may be driven by a respective motor, whose speed may in turn be controlled by operating a respective variable frequency drive. Each variable frequency drive may be managed and/or configured by a respective control unit via, for example, a keypad or graphical display. HVAC systems that have multiple variable frequency drives, such as four, six, or more variable frequency drives, may thus be managed and/or configured by multiple control units, making the process of managing or changing settings or control parameters of the multiple variable frequency drives tedious, repetitive, and inefficient.

Accordingly, the present disclosure provides a control unit that may be communicatively coupled to multiple variable frequency drives. In particular, the control unit may have a controller, and each variable frequency drive may have a respective controller (a "variable frequency drive controller"). The controller of the control unit may be communicatively coupled to each variable frequency drive controller and manage and/or configure the multiple variable frequency drives by sending instructions and/or receiving information from the variable frequency drive controllers. In some embodiments, the control unit may be implemented as a part of a mobile computing device, such that the controller may wirelessly and communicatively couple to each variable frequency drive controller. In this manner, managing or changing settings or control parameters of multiple variable frequency drives may be performed via a single control unit, avoiding the tedious, repetitive, and inefficient process of using multiple control units.

Figure 1:
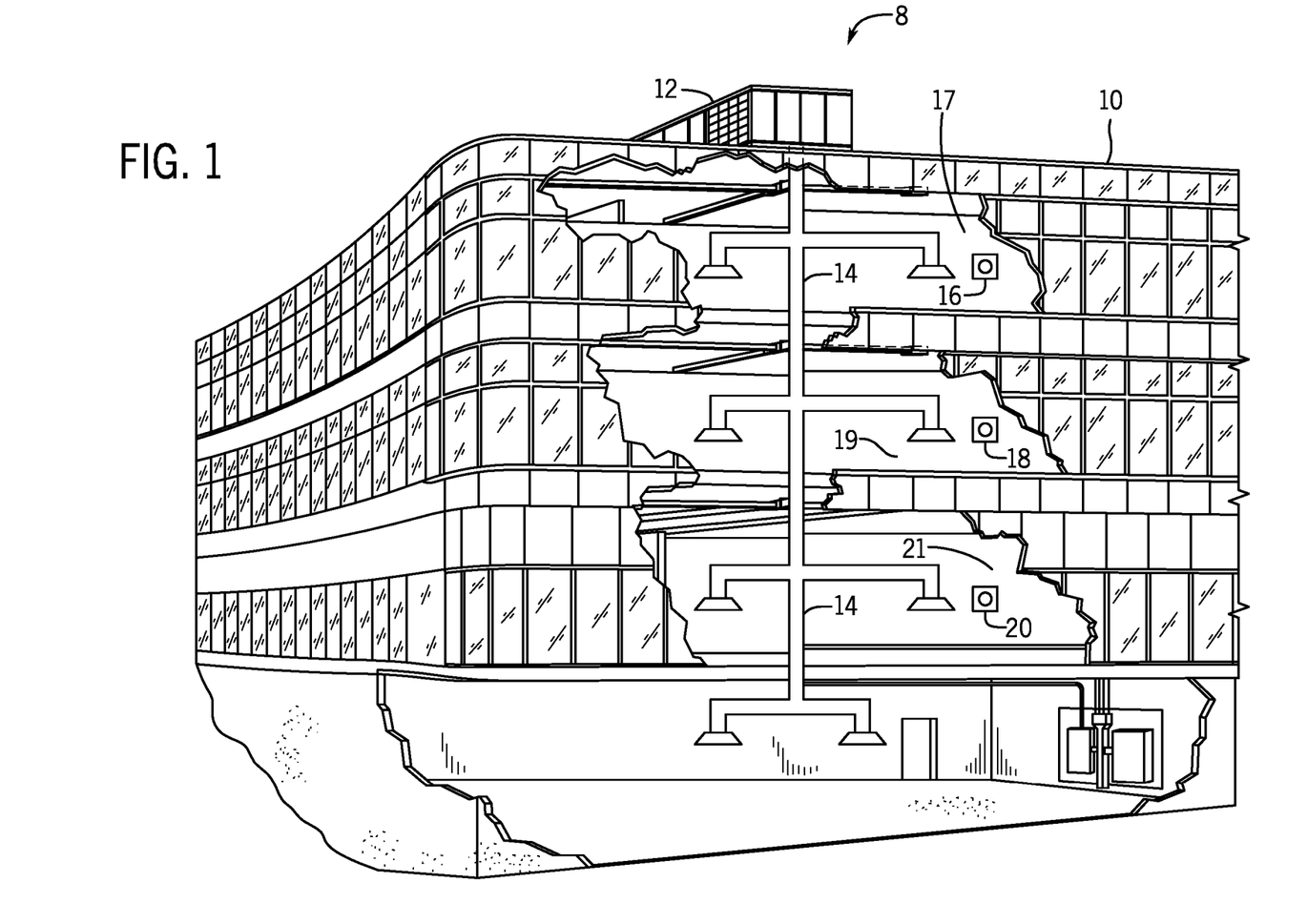
FIG. 1 illustrates a heating, ventilation, and/or air conditioning (HVAC) system for building environmental management that may employ one or more HVAC units, in accordance with an embodiment of the present disclosure.

Turning now to the drawings, FIG. 1 illustrates a conditioned air system 8, such as a heating, ventilation, and/or air conditioning (HVAC) system, for building environmental management that may employ one or more HVAC units. In the illustrated embodiment, a building 10 is air conditioned by the conditioned air system 8 that includes a conditioned air unit or HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may include a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

In any case, the HVAC unit 12 may be an air cooled device that implements a refrigeration cycle to provide conditioned air to the building 10. For example, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the air is conditioned, the HVAC unit 12 may supply the conditioned air to the building 10 via ductwork 14 extending throughout the building 10 from the HVAC unit 12. For example, the ductwork 14 may extend to various individual floors or other sections of the building 10. In some embodiments, the HVAC unit 12 may include a heat pump that provides both heating and cooling to the building 10, for example, with one refrigeration circuit implemented to operate in multiple different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other equipment, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and/or the like. Moreover, the control device 16 may include computer systems that are integrated with or separate from other building control or monitoring systems, and even systems that are remote from the building 10. In some embodiments, the HVAC unit 12 may operate in multiple zones of the building, and be coupled to multiple control devices that each control flow of air in a respective zone. For example, a first control device 16 may control the flow of air in a first zone 17 of the building, a second control device 18 may control the flow of air in a second zone 19 of the building, and a third control device 20 may control the flow of air in a third zone 21 of the building.

Figure 2:
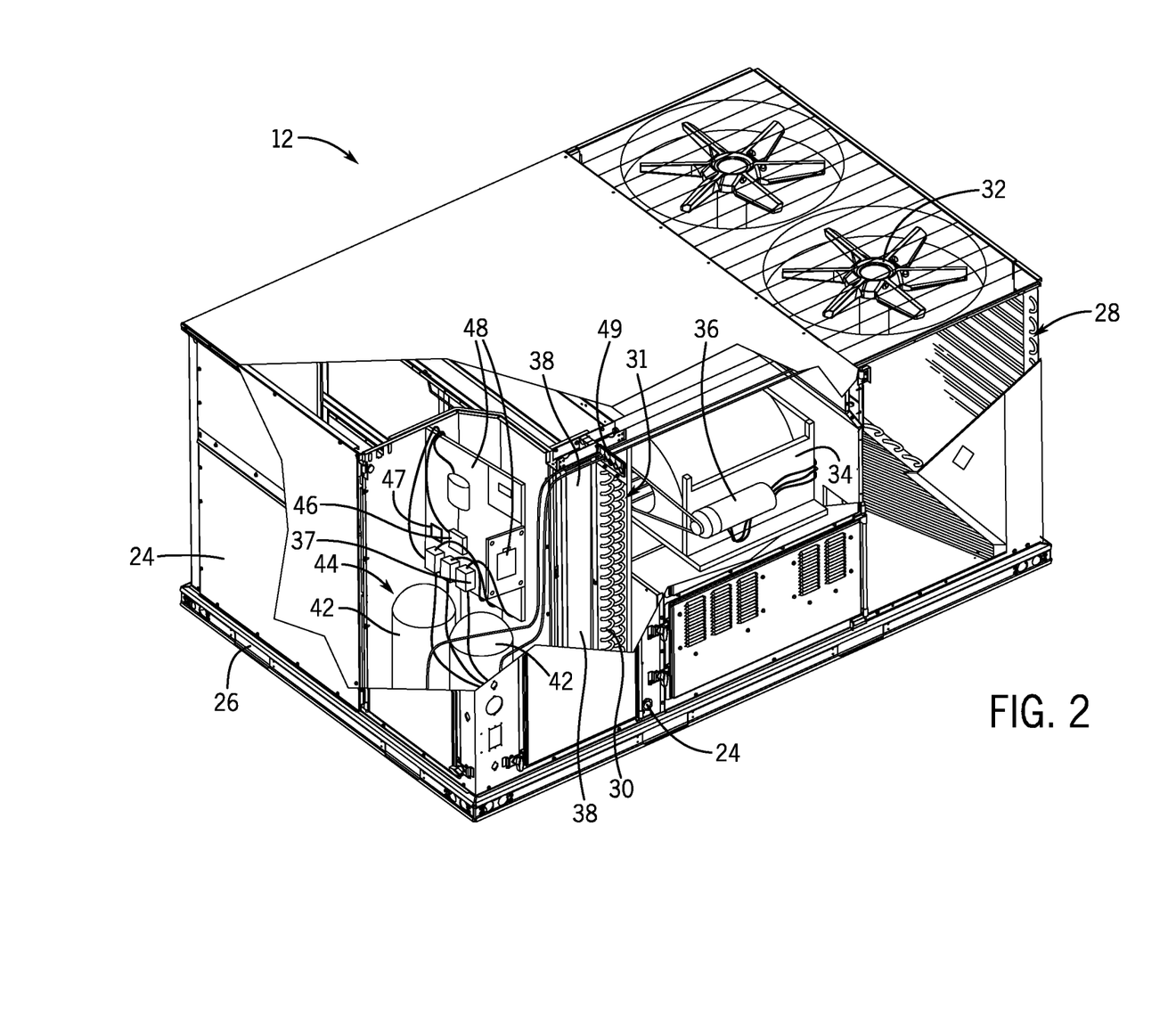
FIG. 2 is a perspective view of a HVAC unit of the HVAC system of FIG. 1, in accordance with an embodiment of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, and/or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12, for example, to provide structural support and/or protect the internal components from environmental contaminant and/or other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and/or the like. Together, the heat exchangers 28 and 30 may implement a thermal cycle in which the refrigerant undergoes phase changes and/or temperature changes as it flows through the heat exchangers 28 and 30 to produce heated and/or cooled air.

For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 may draw air from the environment through the heat exchanger 28. As it flows through the heat exchanger 28, air may be heated or cooled before being released back to the environment surrounding the rooftop unit 12. Each fan 32 may be coupled to a blower assembly 34, which is powered by a respective motor 36, and may draw air through the heat exchanger 30 to heat or cool the air. Each motor 36 may be coupled to a respective variable frequency drive 37 that controls the speed of the motor 36 by adjusting the frequency of electrical power supplied to the respective motor 36.

The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to reduce likelihood of contaminants contacting the heat exchanger 30.

The HVAC unit 12 also may include other equipment for implementing the thermal cycle. Compressors 42 may increase the pressure and/or temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and/or devices may be included in the HVAC unit 12, such as a solid-core filter drier, a drain pan, a disconnect switch, an economizer, pressure switches, phase monitors, and humidity sensors, among other things.

The HVAC unit 12 may receive electrical power via a terminal block 46. For example, a high voltage power source may be connected to the terminal block 46 to power the equipment. For example, the terminal block 46 may be coupled to each variable frequency drive (VFD) 37 to provide power to the respective variable frequency drive 37. The operation of the HVAC unit 12 may be governed or regulated by a control board 48. The control board 48 may include control circuitry connected to a thermostat, a sensor, an alarm, and/or a variable frequency drive 37. One or more of these components may be referred to herein separately or collectively as the control device 16. The control circuitry may control operation of the equipment, provide alarms, and/or monitor safety switches. For example, as illustrated, the control board 48 is communicatively coupled to a VFD control unit 47 that may in turn be communicatively coupled to each controller of each variable frequency drive 37. As such, operation of each variable frequency drive 37 may be managed and/or configured via the VFD control unit 47. Wiring 49 may connect the control board 48 and the terminal block 46 to the equipment of the HVAC unit 12.

Figure 3:
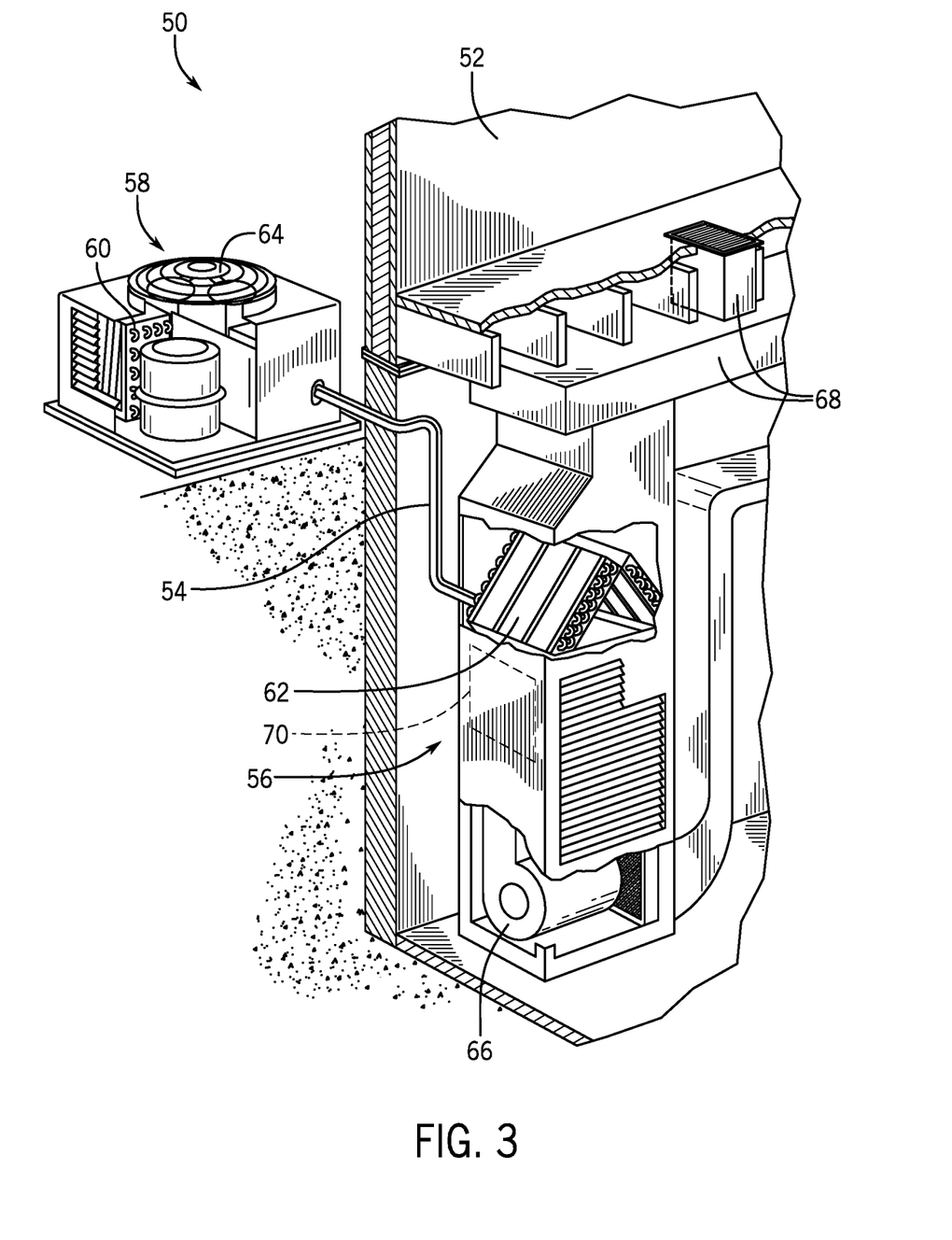
FIG. 3 illustrates a residential heating and cooling system, in accordance with an embodiment of the present disclosure.

FIG. 3 illustrates a residential heating and cooling system 50, also in accordance with present techniques. The residential heating and cooling system 50 may provide heated air to a residential structure, cooled air to a residential structure, ventilation for the residential structure, and/or improved indoor air quality (IAQ) through devices, such as ultraviolet lights and/or air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 may transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 may serve as a condenser for re-condensing vaporized refrigerant flowing from the indoor unit 56 to the outdoor unit 58 via one of the refrigerant conduits 54. In these applications, a heat exchanger 62 of the indoor unit may function as an evaporator. Specifically, the heat exchanger 62 may receive liquid refrigerant, which may be expanded by an expansion device, and evaporate the refrigerant before returning it to the outdoor unit 58.

The outdoor unit 58 may draw environmental air through the heat exchanger 60 using a fan 64 and expels the air above the outdoor unit 58. When operating in an air conditioner mode, the air heated by the heat exchanger 60 within the outdoor unit 58 exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52.

The overall system operates to maintain a desired temperature as set by a system controller. When the temperature sensed inside the residence 52 is higher than the setpoint on the thermostat, or the setpoint plus a small amount, the residential heating and cooling system 50 may become operative to refrigerate or cool additional air for circulation through the residence 52. When the temperature reaches the setpoint, or the setpoint minus a small amount, the residential heating and cooling system 50 may stop the refrigeration cycle temporarily.

The residential heating and cooling system 50 may also operate in a heat pump mode. When operating in the heat pump mode, the roles of heat exchangers 60 and 62 may be reversed. That is, the heat exchanger 60 of the outdoor unit 58 may serve as an evaporator to evaporate refrigerant and thereby cool air entering the outdoor unit 58 as the air passes over outdoor the heat exchanger 60. The indoor heat exchanger 62 may receive a stream of air blown over it and heat the air by condensing the refrigerant.

In some embodiments, the indoor unit 56 may include a furnace system 70. For example, the indoor unit 56 may include the furnace system 70 when the residential heating and cooling system 50 is not implemented to operate as a heat pump. The furnace system 70 may include a burner assembly and heat exchanger, among other components, inside the indoor unit 56. Fuel may be provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
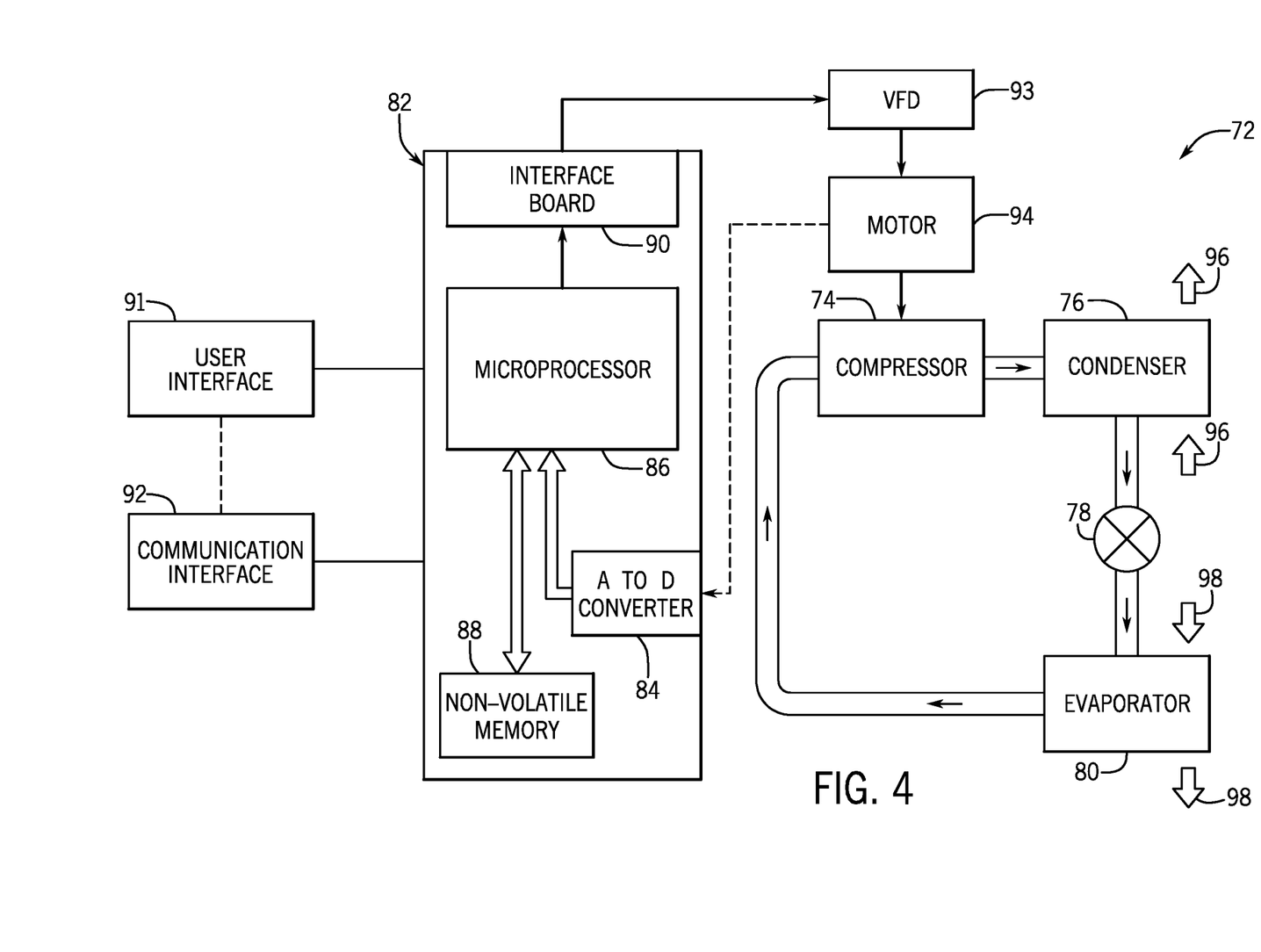
FIG. 4 illustrates a conditioned air system or a vapor compression system that may be used in the HVAC system of FIG. 1 and in the residential heating and cooling system of FIG. 3, in accordance with an embodiment of the present disclosure.

FIG. 4 is an embodiment of a conditioned air or vapor compression system 72, that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a processor or microprocessor 86, a memory device such as a non-volatile memory 88, and/or an interface board 90.

The control panel 82 and its components may function to regulate operation of the vapor compression system 72 based on feedback from an operator, from sensors of the vapor compression system 72 that detect operating conditions, and so forth. The processor 86 may include any type of processing circuitry, such as one or more processors, one or more "general-purpose" microprocessors, one or more special-purpose microprocessors, and/or one or more application specific integrated circuits (ASICS), or some combination thereof. For example, the processor 86 may include one or more reduced instruction set (RISC) processors.

The control panel 82 may be communicatively coupled to and/or include a user interface 91 that provides information to and/or receives information from a user. The user interface 91 may include any suitable combination of input and output devices, such as an electronic display, a touchscreen, a stylus, a keypad, a button, and/or the like, to enable communicating system fault and/or malfunction information to a user.

In some embodiments, the control panel 82 may be communicatively coupled to and/or include a communication interface 92 that may enable communication with any suitable communication network, such as wiring terminals, a cellular network, a WiFi network, a personal area network (PAN), a local area network (LAN), a wide area network (WAN), and/or the like. For example, the communication interface 92 may enable the control panel 82 to communicate with a user interface 91 implemented on a user's mobile device, which is also communicatively coupled to the communication network.

In some embodiments, the vapor compression system 72 may use one or more of variable frequency drives (VFDs) 93, a motor 94, the compressor 74, the condenser 76, the expansion valve or device 78, and/or the evaporator 80. The motor 94 may drive the compressor 74 and may be powered by the variable frequency drive 93. The variable frequency drive 93 may receive alternating current (AC) power having a particular fixed line voltage and fixed line frequency from an AC power source, and provide power having a variable voltage and frequency to the motor 94. The motor 94 may include any type of electric motor that can be powered by the variable frequency drive 93, such as a switched reluctance motor, an induction motor, an electronically commutated permanent magnet motor, or another suitable motor.

The compressor 74 may compress a refrigerant vapor and deliver the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant may exit the evaporator 80 and return to the compressor 74 by a suction line to complete the cycle.

In some embodiments, the vapor compression system 72 may further include a reheat coil in addition to the evaporator 80. For example, the reheat coil may be positioned downstream of the evaporator 80 relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC system. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The description above with reference to FIGS. 1-4 is intended to be illustrative of the context of the present disclosure. The techniques of the present disclosure may update features of the description above. In particular, as will be discussed in more detail below, the present disclosure provides a control unit used to control variable frequency drives of an HVAC system.

Figure 5:
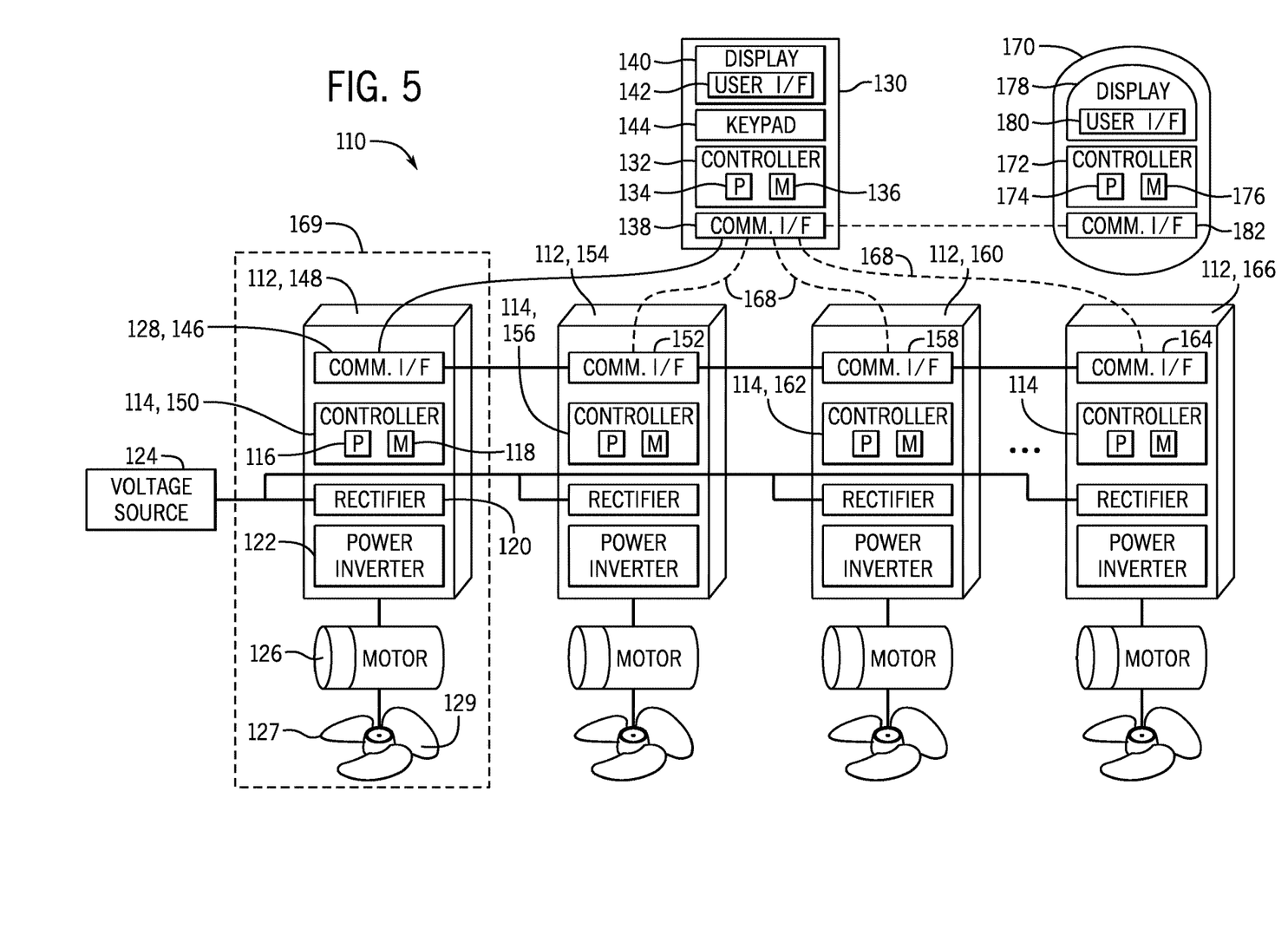
FIG. 5 is a schematic diagram of a system for controlling multiple variable frequency drives of an HVAC system, according to embodiments of the present disclosure.

To help illustrate, FIG. 5 is a schematic diagram of a system 110 for controlling multiple variable frequency drives 112 of an HVAC system, according to embodiments of the present disclosure. The HVAC system may include the conditioned air system 8 of FIG. 1, the residential heating and cooling system 50 of FIG. 3, the conditioned air or vapor compression system 72 of FIG. 4. As illustrated, the system 110 is illustrated as having four variable frequency drives 112, it should be understood that the system 110 may apply to any suitable number of variable frequency drives 112, such as two to one hundred, three to fifty, five to twenty, or even more variable frequency drives 112.

Each variable frequency drive 112 may include a controller 114 that controls the operation of a respective variable frequency drive 112. Each controller 114 may have a processor 116 and a memory device 118. The processor 116 may include any suitable type of processing circuitry, such as one or more processors, one or more "general-purpose" microprocessors, one or more special-purpose microprocessors, and/or one or more application specific integrated circuits (ASICS), or some combination thereof. For example, the processor 116 may include one or more reduced instruction set (RISC) processors. The memory device 118 may include any suitable type of memory that stores instructions (e.g., software) executable by the processor 116, such as a non-volatile and/or volatile memory.

Each variable frequency drive 112 may also include a rectifier 120 and a power inverter 122. The rectifier 120 may be coupled to a voltage source 124, such as an alternating current voltage source, and receive alternating current from the voltage source 124. The controller 114 may control the rectifier 120 to convert the alternating current supply voltage from the voltage source 124 to a direct current voltage. The rectifier 120 may thus include any suitable components that convert an alternating current voltage to a direct current voltage, such as, for example, a diode bridge converter, direct current capacitors, and so on. The power inverter 122 may be coupled to the rectifier 120 and receive the converted direct current voltage from the rectifier 120. The controller 114 may control the power inverter 122 to convert the converted direct current voltage to a frequency-controlled alternating current voltage having a desired frequency. The power inverter 122 may thus include any suitable components that convert a direct current voltage to a frequency-controlled alternating current voltage, such as, for example, insulated gate bipolar transistors. In some embodiments, the power inverter 122 may use pulse width modulation techniques to generate the frequency-controlled alternating current voltage having the desired frequency by varying widths of pulses of the frequency of the frequency-controlled alternating current voltage. A motor 126 may be coupled to each power inverter 122 and be driven by the frequency-controlled alternating current voltage output by the respective power inverter 122. A fan 127 may be coupled to each motor 126, which drives the fan 127 based on the frequency-controlled alternating current voltage received from the respective power inverter 122. Driving the fan 127 causes fan blades 129 of the fan 127 to rotate and direct airflow through the HVAC system and into a structure or building.

Each variable frequency drive 112 may further include a communication interface 128 that enables a respective VFD controller 114 to communicate with other electronic devices. For example, the communication interface 128 may enable the VFD controller 114 to communicate with any suitable communication network to communicatively couple to another electronic device. As such, the communication interface 128 may enable the VFD controller 114 to communicate with wireless networks, such as a mobile, WiFi, LAN, WAN, or Internet network, through which the VFD controller 114 may communicatively couple to a communication interface of another electronic device. The communication interface 128 may also or alternatively enable the VFD controller 114 to communicatively couple to a communication interface of another electronic device through wire-based communication technology, such as Ethernet, RS-232, RS-485, UART, USART, or USB technology.

The system 110 includes a multi-variable frequency drive control unit 130 having a controller 132 that controls the operation of components of the multi-variable frequency drive control unit 13. The controller 132 may include a processor 134 and a memory device 136. The processor 134 may include any suitable type of processing circuitry, such as one or more processors, one or more "general-purpose" microprocessors, one or more special-purpose microprocessors, and/or one or more application specific integrated circuits (ASICS), or some combination thereof. For example, the processor 134 may include one or more reduced instruction set (RISC) processors. The memory device 136 may include any suitable type of memory that stores instructions, such as in the form of software, executable by the processor 134, such as a non-volatile and/or volatile memory.

The multi-VFD controller 132 may be coupled to a communication interface 138 that enables the control unit 130 to communicate with other electronic devices. For example, the communication interface 138 may enable the multi-VFD control unit 130 communicate with any suitable communication network to communicatively couple to another electronic device. As such, the communication interface 138 may enable the multi-VFD control unit 130 to communicate with wireless networks, such as a mobile, WiFi, LAN, WAN, or Internet network, through which the multi-VFD control unit 130 may communicatively couple to a communication interface of another electronic device. The communication interface 138 may also or alternatively enable the multi-VFD control unit 130 to communicatively couple to a communication interface of another electronic device through wire-based communication technology.

In some embodiments, the multi-VFD control unit 130 may be coupled to an electronic display 140 that enables a user to view information associated with the multi-VFD control unit 130 and/or the variable frequency drives 112. The display 140 may include a user interface 142 that enables a user to select options provided by the display 140 and/or configure operational settings or control parameters associated with the multi-VFD control unit 130 and/or the variable frequency drives 112. In alternative or additional embodiments, the multi-VFD controller 132 may be coupled to a keypad 144 that enables a user to select options provided by the display 140 and/or configure settings or control parameters associated with the multi-VFD control unit 130 and/or the variable frequency drives 112. It should be understood that, while FIG. 5 illustrates the multi-VFD control unit 130 receiving input via the user interface 142 and the keypad 144, any suitable input device or technique may be used to receive input from a user, such as a keyboard, mousing device, trackpad, and so on.

As illustrated, the communication interface 138 enables the multi-VFD control unit 130 to communicatively couple to a first communication interface 146 of a first variable frequency drive 148. The first communication interface 146 of the first variable frequency drive 148 also enables a first VFD controller 150 of the first variable frequency drive 148 to communicate with a second communication interface 152 of a second variable frequency drive 154. Additionally, the second communication interface 152 of the second variable frequency drive 154 enables a second VFD controller 156 of the second variable frequency drive 154 to communicate with a third communication interface 158 of a third variable frequency drive 160. Moreover, the third communication interface 158 of the third variable frequency drive 160 enables a third VFD controller 162 of the third variable frequency drive 160 to communicate with a fourth communication interface 164 of a fourth variable frequency drive 166. The variable frequency drives 112 may thus be communicatively coupled together via a "daisy chain" configuration or communication structure, enabling each VFD controller 114 of each variable frequency drive 112 and the multi-VFD controller 132 of the multi-VFD control unit 130 to communicate with one another. In additional or alternative embodiments, each VFD controller 114 of each variable frequency drive 112 may be directly coupled to the multi-VFD controller 132 of the multi-VFD control unit 130 (as illustrated by the dashed lines 168) via a "hub" or parallel configuration or communication structure. Each variable frequency drive 112, corresponding motor 126, and corresponding fan 127 may be referred to as a fan system 169.

In particular, each variable frequency drive 112 may have an address that identifies a respective variable frequency drive 112. The address of the respective variable frequency drive 112 may be a unique address relative to other variable frequency drives 112, and may be based in part on a manufacturer, model number, and/or serial number of the respective variable frequency drive 112. The address may alternatively or additionally be based in part on a communication protocol used to communicatively coupled to the respective variable frequency drive 112, such as the Transmission Control Protocol (TCP), the Internet Protocol (IP), the Ethernet protocol, the media access control (MAC) protocol, and so on. In some embodiments, the processor 134 of the multi-VFD controller 132 and each processor 116 of a respective VFD controller 114 may execute a software application, which may be stored in the memory device 136 of the multi-VFD controller 132 and a respective memory device 118 of each VFD controller 114, that enables the multi-VFD controller 132 to communicate with the respective variable frequency drive 112 (via the communication interface 138 and a respective communication interface 128) by entering or selecting the address of the respective variable frequency drive 112. For example, the software application may be a Modbus software application that enables communication using the Modbus serial communications protocol. The address of a target variable frequency drive 112 may be entered via the user interface 142 and/or the keypad 144 of the multi-VFD control unit 130, and/or searched for via the communication interface 138 of the multi-VFD control unit 130 and selected via the user interface 142 and/or the keypad 144 of the multi-VFD control unit 130.

In this manner, the user interface 142 and/or the keypad 144 of the multi-VFD control unit 130 may enable adjusting one or more settings or control parameters of each variable frequency drive 112 communicatively coupled via the communication interface 138 of the multi-VFD control unit 130 and the communication interfaces 128 of the variable frequency drives 112. The settings or control parameters of each variable frequency drive 112 may be adjusted to control environmental conditions of the structure and/or responsiveness of each variable frequency drive 112. As such, the settings or control parameters of each variable frequency drive 112 may include a setpoint of a respective variable frequency drive 112. In particular, the setpoint of a variable frequency drive 112 may refer to a trigger or threshold value that is compared to a measured value, wherein a resulting action may be performed based on the comparison. In some embodiments, one or more variable frequency drives 112 may include a proportional-integral-derivative controller that enables a control loop feedback mechanism. In particular, the proportional-integral-derivative controller may continuously calculate an error value as the difference between the setpoint and a measured value and apply a correction based on proportional, integral, and derivative terms. For example, a variable frequency drive 112 may include a pressure sensor that measures a pressure value of a corresponding fan 127. The controller 114 of the variable frequency drive 112 may compare the measured pressure value to the setpoint, generate a reference signal based on the comparison, and control a corresponding motor 126 to adjust a speed of the corresponding fan 127 based on the reference signal. The user interface 142 and/or the keypad 144 of the multi-VFD control unit 130 may enable adjusting the setpoint, or any other parameters associated with the proportional-integral-derivative controller of the variable frequency drive 112, such as the proportional, integral, or derivative terms. Additionally or alternatively, the settings or control parameters of each variable frequency drive 112 may include a threshold range associated with the setpoint for which to generate the reference signal, an amount of time for a respective variable frequency drive to generate the reference signal in response to the respective variable frequency drive determining the pressure value and the setpoint are approximately equal, a start value and/or an error ramp time associated with when a respective variable frequency drive 112 starts up, and so on. In some embodiments, the user interface 142 and/or the keypad 144 of the multi-VFD control unit 130 may enable motor tuning, such that the one or more settings of a variable frequency drive 112 may be set to match a corresponding motor 126. Such motor tuning may enable better and/or more efficient performance by the affected motor 126 and/or the corresponding fan 127.

Moreover, the system 110 may include a computing device 170 that may be communicatively coupled to the multi-VFD control unit 130. For example, the computing device 170 may include desktop computer, a personal computer, or a mobile computing device, such as a cell phone, a smartphone, a wearable device, a tablet, or a laptop. As illustrated, the computing device 170 may include a controller 172 that controls operations of the computing device 170. The controller 172 may include a processor 174 and a memory device 176. The processor 174 may include any suitable type of processing circuitry, such as one or more processors, one or more "general-purpose" microprocessors, one or more special-purpose microprocessors, and/or one or more application specific integrated circuits (ASICS), or some combination thereof. For example, the processor 174 may include one or more reduced instruction set (RISC) processors. The memory device 176 may include any suitable type of memory that stores instructions, such as in the form of software, executable by the processor 174, such as a non-volatile and/or volatile memory.

The controller 172 may be coupled to an electronic display 178 that enables a user to view information associated with the computing device 170. The display 178 may include a user interface 180 that enables a user to input information to the computing device 170. In alternative or additional embodiments, any suitable input device or technique may be used to receive input from a user, such as a keyboard, mousing device, trackpad, and so on.

The controller 172 may be coupled to a communication interface 182 that enables the computing device 170 to communicate with other electronic devices. For example, the communication interface 182 may enable the computing device 170 to communicate with any suitable communication network to communicatively couple to another electronic device. As such, the communication interface 182 may enable the computing device controller 172 to communicate with wireless networks, such as a mobile, WiFi, LAN, WAN, or Internet network, through which the computing device controller 172 may communicatively couple to the communication interface 138 of the multi-VFD control unit 130. The communication interface 182 may also or alternatively enable the computing device controller 172 to communicatively couple to the communication interface 138 of the multi-VFD control unit 130 through wire-based communication technology, such as Ethernet, RS-232, RS-485, UART, USART, or USB technology.

As such, in some embodiments, the communication interface 182 may enable the computing device 170 to adjust the one or more settings of each variable frequency drive 112 by communicatively coupling to each communication interface 128 of each variable frequency drive 112 through the communication interface 138 of the multi-VFD control unit 130. In particular, the display 140 of the computing device 170 may display the one or more settings of a respective variable frequency drive 112, and a user may adjust the one or more settings via the user interface 180 of the computing device 170.

In some embodiments, each communication interface 128 of each variable frequency drive 112 may be communicatively coupled to a central communication interface associated with a control panel. For example, each communication interface 128 of each variable frequency drive 112 may be communicatively coupled to the communication interface 92, which is in turn communicatively coupled to the control panel 82 of the conditioned air or vapor compression system 72 of FIG. 4. As such, the communication interface 138 of the multi-VFD control unit 130 may also be communicatively coupled to the communication interface 92, thus enabling the controller 132 of the multi-VFD control unit 130 to adjust the one or more settings of each variable frequency drive 112. Moreover, while each VFD controller 114 is described as controlling the operation of a respective variable frequency drive 112, it should be understood that each VFD controller 114 may also or alternatively be controlled by the control panel 82 (via the communication interfaces 92, 138).

Figure 6:
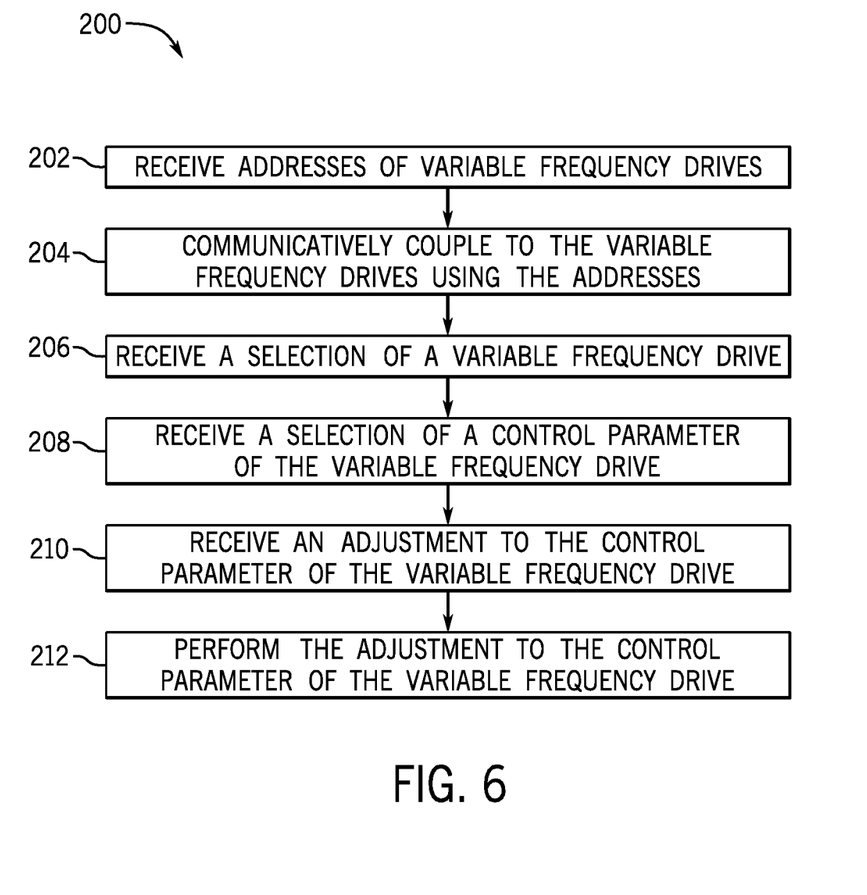
FIG. 6 is a flow diagram of a process for controlling multiple variable frequency drives, according to embodiments of the present disclosure.

With the foregoing in mind, FIG. 6 is a flow diagram of a process 200 for controlling multiple variable frequency drives 112, according to embodiments of the present disclosure. While the process 200 is described using steps in a specific sequence, it should be understood that the present disclosure contemplates that the described steps may be performed in different sequences than the sequence illustrated, and certain described steps may be skipped or not performed altogether. In some embodiments, the process 200 may be implemented by executing instructions stored in a tangible, non-transitory, computer-readable medium, such as the memory device 136, using a processor, such as the processor 134 of the multi-VFD control unit 130.

As illustrated, the processor 134 of the multi-VFD control unit 130 receives, at process block 202, addresses of the variable frequency drives 112. In particular, each address of a variable frequency drive 112 may be entered via the user interface 142 and/or the keypad 144 of the multi-VFD control unit 130, and/or searched for via the communication interface 138 of the multi-VFD control unit 130 and selected via the user interface 142 and/or the keypad 144 of the multi-VFD control unit 130.

In process block 204, the processor 134 then communicatively couples to the variable frequency drives 112 using the addresses of the variable frequency drives 112. In some embodiments, the processor 134 of the multi-VFD controller 132 and each processor 116 of a respective VFD controller 114 may execute a software application, which may be stored in the memory device 136 of the multi-VFD controller 132 and a respective memory device 118 of each VFD controller 114, that enables the multi-VFD control unit 130 to communicate with the respective variable frequency drive 112 (via the communication interface 138 and a respective communication interface 128) by entering or selecting the address of the respective variable frequency drive 112. For example, the software application may be a Modbus software application that enables communication using the Modbus serial communications protocol.

In process block 206, the processor 134 receives a selection of a variable frequency drive 112. For example, the user interface 180 of the computing device 170 may enable the selection of the variable frequency drive 112 from those variable frequency drives 112 communicatively coupled to the multi-VFD control unit 130. In some embodiments, the selection may be made by a user of the multi-VFD control unit 130.

In process block 208, the processor 134 then receives a selection of a setting of the variable frequency drive 112. In particular, the user interface 180 of the computing device 170 may enable the selection of the setting of the variable frequency drive 112. For example, the setting may include a setpoint of the variable frequency drive 112, a parameter of a proportional-integral-derivative controller of the variable frequency drive 112 (e.g., such as a proportional, integral, or derivative term), a setting of the variable frequency drive 112 associated with a corresponding motor 126 (e.g., related to a speed, load, or tolerance of the variable frequency drive 112 and/or the corresponding motor 126), and so on. In some embodiments, the selection may be made by a user of the multi-VFD control unit 130.

In process block 210, the processor 134 then receives an adjustment to the setting of the variable frequency drive 112. In particular, the user interface 180 of the computing device 170 may enable the adjustment to the setting of the variable frequency drive 112. For example, the adjustment may include changing a setpoint of the variable frequency drive 112, changing a parameter of a proportional-integral-derivative controller of the variable frequency drive 112, matching one or more settings of the variable frequency drive 112 to a corresponding motor 126, and so on. In some embodiments, the selection may be made by a user of the multi-VFD control unit 130.

In process block 212, the processor 134 performs the adjustment to the setting of the variable frequency drive 112. That is, the processor 134 may send the adjustment as an instruction and/or signal to the variable frequency drive 112 via the communication interface 138 of the multi-VFD control unit 130 and a respective communication interface 128 of the variable frequency drive 112. The controller 114 of the variable frequency drive 112 may receive the instruction and/or signal, and perform the adjustment. Because multiple variable frequency drives 112 may be communicatively coupled to the multi-VFD control unit 130 (via the communication interface 138 of the control unit 130 and respective communication interfaces 128 of the variable frequency drives 112), the multi-VFD control unit 130 may manage and/or change settings of the multiple variable frequency drives 112 via a single control unit, avoiding the tedious, repetitive, and inefficient process of using multiple control units.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A heating, ventilation, and air conditioning (HVAC) system comprising:
    a plurality of fans configured to direct airflow through the HVAC system;
    a plurality of motors, wherein each motor is coupled to and configured to drive a respective fan of the plurality of fans;
    a plurality of variable frequency drives, wherein a first variable frequency drive of the plurality of variable frequency drives is coupled to a first motor of the plurality of motors, and wherein a second variable frequency drive of the plurality of variable frequency drives is coupled to a second motor of the plurality of motors; and
    a multi-variable frequency drive control unit comprising a multi-variable frequency drive controller communicatively coupled to each variable frequency drive of the plurality of variable frequency drives, wherein the multi-variable frequency drive controller is configured to operate the first variable frequency drive and the second variable frequency drive concurrently, and wherein the multi-variable frequency drive controller is configured to adjust a control parameter of each variable frequency drive to control a respective speed at which the respective motor drives the respective fan by adjusting frequency of electrical power supplied to the respective motor.

2. The HVAC system of claim 1, wherein the multi-variable frequency drive control unit comprises a display configured to display system malfunction information associated with the control parameter of each variable frequency drive of the plurality of variable frequency drives.

3. The HVAC system of claim 2, wherein the multi-variable frequency drive control unit comprises the display being configured to display a user interface, wherein the user interface enables selecting one or more options of a plurality of options to adjust the control parameter of each variable frequency drive of the plurality of variable frequency drives.

4. The HVAC system of claim 1, wherein the multi-variable frequency drive control unit comprises a keypad configured to enable adjusting the control parameter of each variable frequency drive of the plurality of variable frequency drives.

5. The HVAC system of claim 1, wherein the multi-variable frequency drive control unit is communicatively coupled to a communication interface, wherein the communication interface is configured to enable the multi-variable frequency drive control unit to communicatively couple to a computing device external to the HVAC system.

6. The HVAC system of claim 5, wherein the communication interface is configured to enable the computing device to adjust the control parameter of each variable frequency drive of the plurality of variable frequency drives via the multi-variable frequency drive control unit.

7. The HVAC system of claim 5, wherein the communication interface is configured to enable the multi-variable frequency drive control unit to communicatively couple to the computing device via a wireless communication protocol.

8. The HVAC system of claim 5, wherein the computing device comprises a cell phone, a smartphone, a wearable device, a tablet, a laptop, a desktop computer, a personal computer, or any combination thereof.

9. The HVAC system of claim 1, wherein each motor of the plurality of motors comprises an alternating current motor.

10. The HVAC system of claim 1, wherein the multi-variable frequency drive controller is configured to adjust the control parameter of each variable frequency drive to control environmental conditions.

11. The HVAC system of claim 1, wherein the multi-variable frequency drive controller is configured to adjust the control parameter of each variable frequency drive to control responsiveness of each variable frequency drive.

12. The HVAC system of claim 1, wherein the multi-variable frequency drive controller is configured to adjust the control parameter of each variable frequency drive by matching the control parameter of a respective variable frequency drive to a corresponding motor of the plurality of motors.

13. A multi-variable frequency drive control unit of a heating, ventilation, and air conditioning (HVAC) system comprising:
    a communication device configured to enable a processor to communicate with a plurality of variable frequency drives, wherein a first variable frequency drive of the plurality of variable frequency drives is coupled to a first fan motor of a plurality of fan motors and is configured to drive the first fan motor of the plurality of fan motors, and wherein a second variable frequency drive of the plurality of variable frequency drives is coupled to a second fan motor of the plurality of fan motors and is configured to drive the second fan motor of the plurality of fan motors; and
    a multi-variable frequency drive controller comprising a memory device and the processor, wherein the processor, when executing instructions stored in the memory device, is configured to:

receive, via the communication device, a plurality of addresses of the plurality of variable frequency drives;

communicatively couple to the plurality of variable frequency drives using the plurality of addresses via the communication device;

operate the first variable frequency drive and the second variable frequency drive concurrently; and adjust respective operational settings of the plurality of variable frequency drives via the communication device to control environmental conditions.

14. The multi-variable frequency drive control unit of claim 13, comprising a display and a user interface, wherein the user interface enables the processor to receive a selection of one or more options of a plurality of options to adjust the respective operational settings of the plurality of variable frequency drives.

15. The multi-variable frequency drive control unit of claim 13, wherein the communication device is configured to enable the processor to communicatively couple to a mobile computing device, wherein the processor is configured to receive an adjustment of the respective operational settings of the plurality of variable frequency drives via the mobile computing device.

16. A heating, ventilation, and air conditioning (HVAC) system configured to control environmental conditions comprising:

a plurality of fan systems configured to direct airflow through the HVAC system, wherein each fan system of the plurality of fan systems includes fan blades, a motor configured to drive the fan blades, and a variable frequency drive including a variable frequency drive controller of a plurality of variable frequency drive controllers, wherein each variable frequency drive controller of the plurality of variable frequency drive controllers is coupled to a respective variable frequency drive, and wherein the variable frequency drive controller is configured to control a speed at which the motor drives the fan blades by adjusting power supply to the motor; and a multi-variable frequency drive control unit comprising a multi-variable frequency drive controller communicatively coupled to each variable frequency drive controller of each of the plurality of fan systems, wherein the multi-variable frequency drive controller is configured to adjust a control parameter of each variable frequency drive to control environmental conditions.

17. The HVAC system of claim 16, wherein each variable frequency drive controller is communicatively coupled to another variable frequency drive controller in a daisy chain communication structure.

18. The HVAC system of claim 17, wherein the multi-variable frequency drive control unit is configured to communicate with each variable frequency drive controller via the daisy chain communication structure.

19. The HVAC system of claim 16, comprising a refrigeration circuit, wherein the plurality of fan systems direct a portion of the airflow over the refrigeration circuit.

20. The HVAC system of claim 16 comprising a communication device configured to direct operation of the multi-variable frequency drive control unit via wireless communication.

21. The HVAC system of claim 16, wherein each variable frequency drive of the plurality of fan systems is configured to operate concurrently.

* * * * *